United States Patent [19]
Kumagai

[11] Patent Number: 5,809,240
[45] Date of Patent: Sep. 15, 1998

[54] SYSTEM FOR SEGMENTING GRAPHIC DATA INSTALLED IN RESPECTIVE TERMINAL INTO AREAS CORRESPONDING TO TERMINALS AND EACH AREA IS TO BE MANIPULATED BY ITS RESPECTIVE TERMINAL

[75] Inventor: Yoshitomo Kumagai, Yokohama, Japan

[73] Assignee: Fujitsu Limited, Kanagawa, Japan

[21] Appl. No.: 752,347

[22] Filed: Nov. 19, 1996

Related U.S. Application Data

[63] Continuation of Ser. No. 202,557, Feb. 28, 1994, abandoned.

[30] Foreign Application Priority Data

May 18, 1993 [JP] Japan .................................... 5-115671
Dec. 13, 1993 [JP] Japan .................................... 5-311532

[51] Int. Cl.⁶ ...................................................... G06F 13/00
[52] U.S. Cl. ........................................................... 395/200.35
[58] Field of Search ..................................... 395/330, 331, 395/332, 340, 200.04, 200.34, 200.35, 200.47, 200.48, 200.49, 682, 684; 370/260; 379/202

[56] References Cited

U.S. PATENT DOCUMENTS

| | | |
|---|---|---|
| 5,107,443 | 4/1992 | Smith et al. ............................ 395/158 |
| 5,119,319 | 6/1992 | Tanenbaum ............................ 395/153 |
| 5,200,993 | 4/1993 | Wheeler et al. ..................... 379/93.02 |
| 5,208,912 | 5/1993 | Nakayama ............................. 395/200 |
| 5,220,657 | 6/1993 | Bly et al. ................................ 395/475 |
| 5,276,883 | 1/1994 | Halliwell ........................... 395/200.33 |
| 5,293,619 | 3/1994 | Dean ....................................... 395/650 |
| 5,335,323 | 8/1994 | Kolnick ................................... 395/157 |
| 5,337,407 | 8/1994 | Bates et al. ............................ 395/153 |
| 5,384,835 | 1/1995 | Wheeler et al. ..................... 379/93.25 |
| 5,388,196 | 2/1995 | Pajak et al. ............................ 345/329 |
| 5,392,400 | 2/1995 | Berkowitz et al. ................ 395/200.33 |

*Primary Examiner*—Moustafa M. Meky

[57] ABSTRACT

An object of the present invention is to allow a plurality of people to manipulate a large amount of consistent graphic data concurrently and to simplify development of application programs having a distributed input facility.

Data 2 to be manipulated is stored in one workstation among a plurality of workstations WS1 to WSn connected over a network 5. The data 2 is divided and displayed on each of the workstations. Operators operate input means (e.g., a mouse) included in each workstation to process the data 2 concurrently. A device for implementing a distributed input environment is installed in a window system 1. A window copying unit 1g creates copies of, for example, an editing window opened in one workstation, whereby windows are opened in the other workstations.

30 Claims, 14 Drawing Sheets

Fig.6(A)
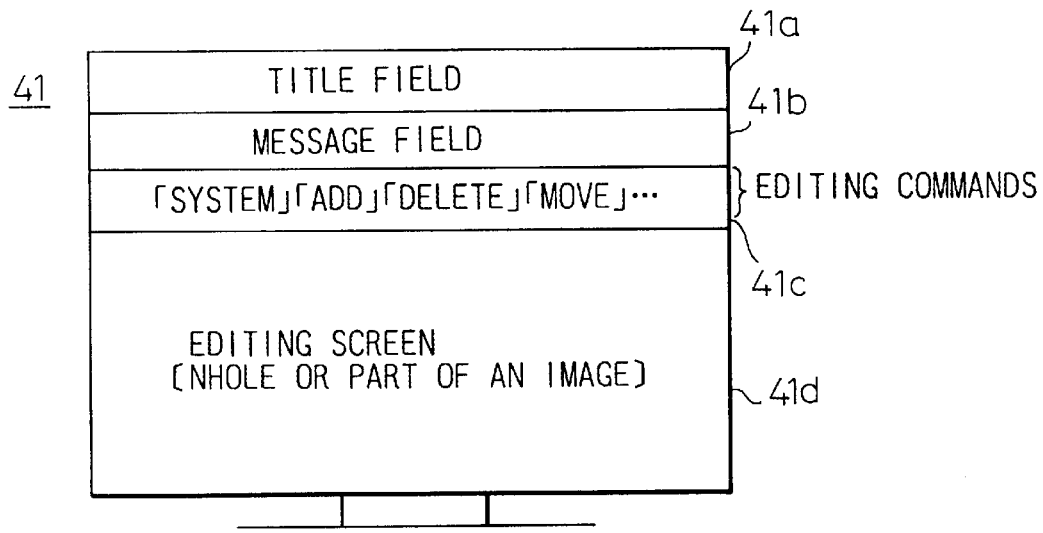
Fig.6(B)　　Fig.6(C)
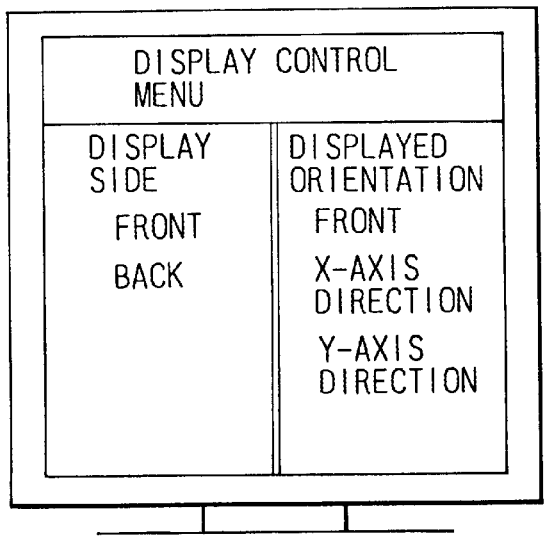 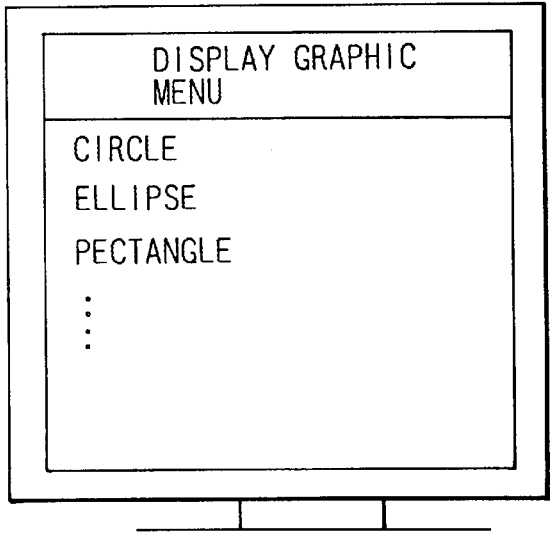

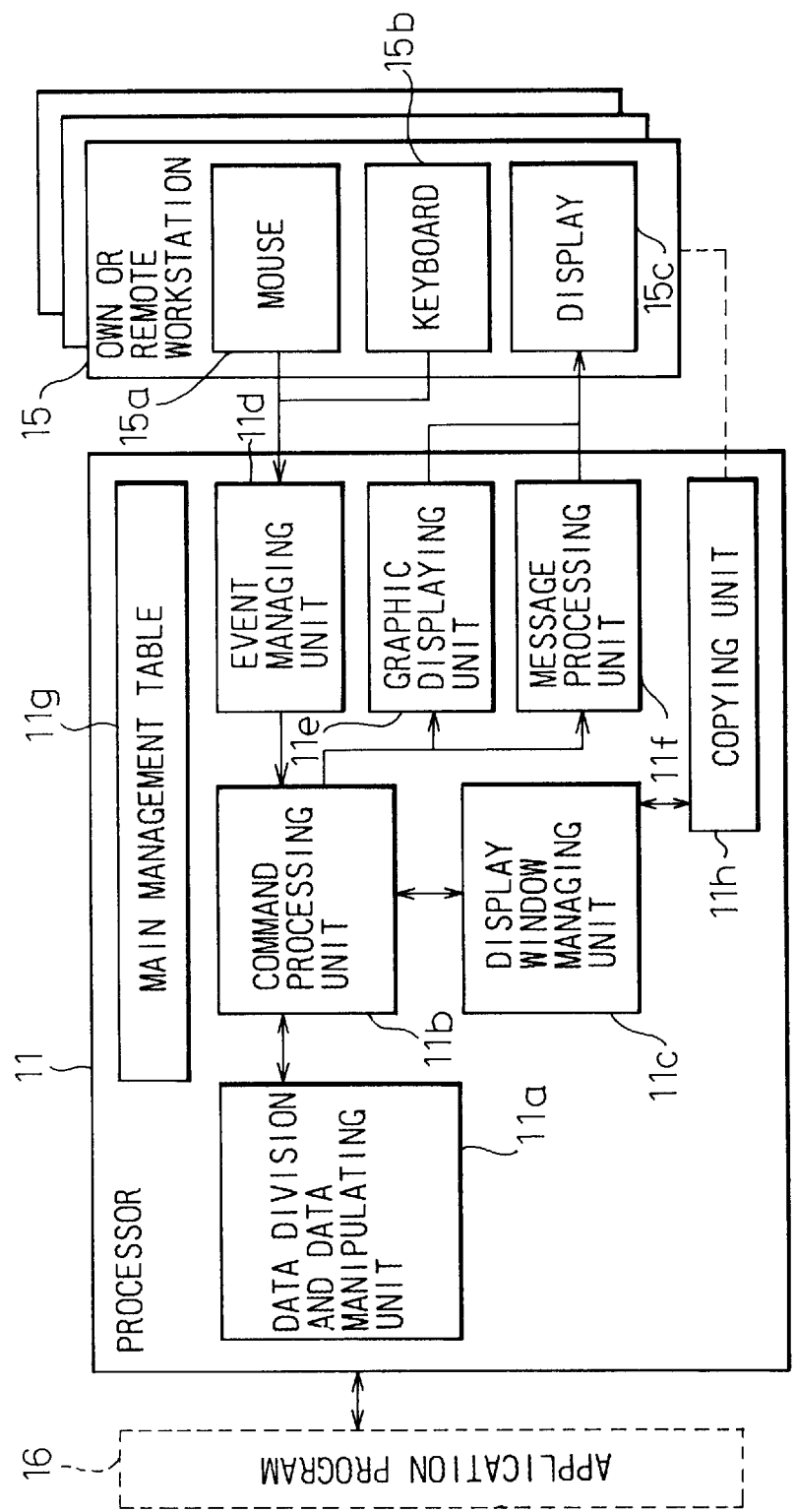

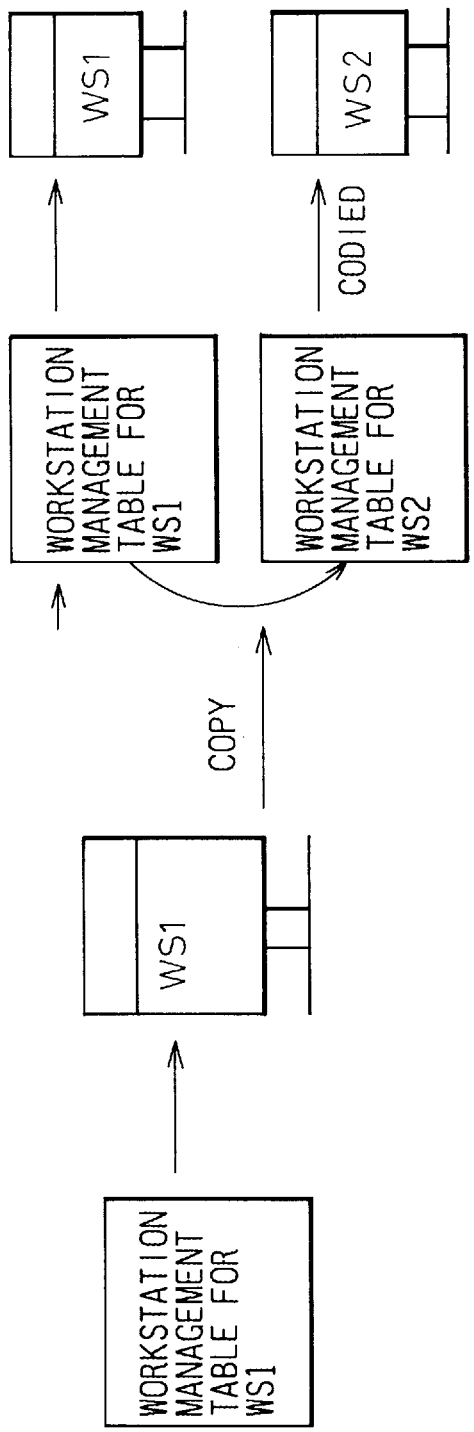

SYSTEM FOR SEGMENTING GRAPHIC DATA INSTALLED IN RESPECTIVE TERMINAL INTO AREAS CORRESPONDING TO TERMINALS AND EACH AREA IS TO BE MANIPULATED BY ITS RESPECTIVE TERMINAL

This application is a continuation of application Ser. No. 08/202,557, filed Feb. 28, 1994, now abandoned.

BACKGROUND OF THE INVENTION

1. Field of the Invention

The present invention relates to an interactive graphic system for manipulating graphic data interactively. More particularly, this invention is concerned with an interactive graphic system permitting segmentation of a large amount of data and enabling manipulation and designing of the data using a plurality of workstations to which the data are allocated.

2. Description of the Related Art

Data to be handled in the world of computer-aided design (CAD) is steadily increasing in amount and becoming more and more complex. The amount of data a person can handle is limited.

To cope with the foregoing problem, a large amount of data has been divided or structured hierarchically, assigned to a plurality of people for parallel manipulation, and then re-united after having been manipulated by the individual people.

However, a method of splitting data for manipulation has a problem in the method of splitting data of managing the split data. Moreover, there are many technological difficulties in manipulating data that extend over two adjoining areas of the split data.

When data is manipulated as a hierarchical structure, that is, when an image is handled as a united body, and split into details and handled detail by detail, technological problems result in hierarchical structuring and file management. Moreover, after data is structured hierarchically because of the increase in amount, the data itself may grow to exceed an amount processable by one person. When data has a finely-hierarchical structure, the overall structure of the data becomes transparent to the users.

SUMMARY OF THE INVENTION

The present invention attempts to solve the aforesaid drawbacks of the prior art. The first object of the present invention is to provide an interactive graphic system that obviates the necessity of splitting or hierarchically structuring a large amount of consistent graphic data, permits allocation of a plurality of areas into which the graphic data is segmented into segments of a given size, allows a plurality of people to manipulate the areas concurrently, and thus helps minimize design time, retains the consistency in data, and simplifies data management.

The second object of the present invention is to provide an interactive graphic system for assisting in development of application programs having a distributed processing facility that allows a plurality of people to concurrently manipulate individual areas of segmented graphic data.

The third object of the present invention is to provide a user-friendly interactive graphic system allowing a user to operate a distributed input facility composed of a plurality of distributed workstations.

An interactive graphic system according to the present invention has a configuration designed to achieve the foregoing objects, or fundamentally, a technological configuration as mentioned below. That is to say, in an interactive graphic system in which a plurality of workstations WS1 to WSn are connected over a network 5 to manipulate data interactively, graphic data 2 to be manipulated is installed in one workstation WS1 among the plurality of workstations WS1 to WSn, and the graphic data 2 is manipulated concurrently by the plurality of workstations WS1 to WSn. Thus, the interactive graphic system enables allocation and manipulation of the graphic data 2.

The interactive graphic system according to the present invention has the foregoing technological configuration. In the first aspect described as claim 1 of the present invention, graphic data 2 to be manipulated is installed in one workstation WS1 among a plurality of workstations WS1 to WSn, and the graphic data 2 is manipulated concurrently by the plurality of workstations WS1 to WSn. The large amount of graphic data 2 is thus allocated to and manipulated by the workstations. This contributes to minimization of design time, retention of consistency in data, and an improvement in system reliability.

BRIEF DESCRIPTION OF THE DRAWINGS

FIGS. 6A, 6B, and 6C show examples of display screens in a workstation;

FIG. 7 shows a configuration of a processor in the second embodiment of the present invention;

FIG. 10 is an explanatory diagram (continued) concerning processing to be performed when a window is opened;

DETAILED DESCRIPTION OF THE PREFERRED EMBODIMENT

An example of an interactive graphic system according to the present invention will now be described with reference to the drawings.

Figure 1:
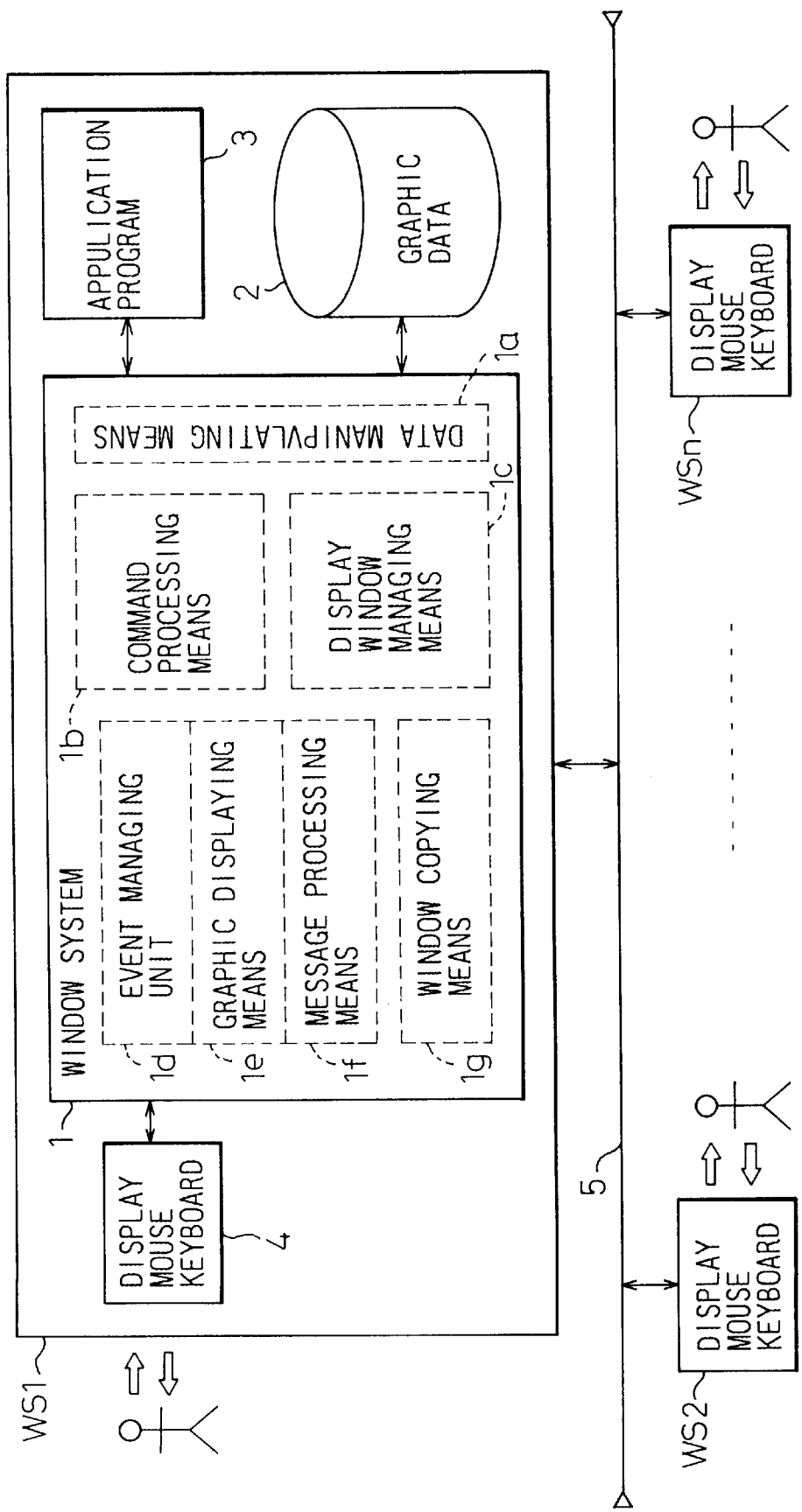
FIG. 1 is an explanatory diagram showing the principle of he present invention.

FIG. 1 is an explanatory diagram concerning the principle of the present invention. In FIG. 1, WS1 to WSn denote workstations. In the figure, 1 denotes a window system; 1*a* denotes a data manipulating means for effecting data manipulation; 1*b* denotes a command processing means for handling commands entered at workstations; 1*c* denotes a display window managing means for managing areas of graphic data or window areas to be manipulated by workstations; 1*d* denotes an event managing means for managing events entered using mice or keyboards; 1*e* denotes a graphic displaying means for outputting graphic data to a display; 1*f* denotes a message processing means for handling messages to be output to the display; 1*g* denotes a window copying means for copying a window when the window is opened in a workstation; 2 denotes graphic data to be manipulated; 3 denotes an application program; 4 denotes an operation display means including a display or a mouse; and 5 denotes a network.

According to the basic technological configuration of the present invention, in the interactive graphic system, the plurality of workstations WS1 to WSn are connected over the network 5 for interactive data manipulation. Herein, the graphic data 2 to be manipulated is installed in the workstation WS1 among the plurality of workstations WS1 to WSn. The graphic data 2 is manipulated concurrently by the plurality of workstations WS1 to WSn. Thus, the graphic data 2 is allocated to and manipulated by the workstations.

According to the present invention, in the interactive graphic system, the plurality of workstations WS1 to WSn are connected over the network 5 to manipulate data interactively. The graphic data 2 to be manipulated is installed in the workstation WS1 among the plurality of workstations WS1 to WSn. The graphic data 2 is segmented into a plurality of areas. The areas are associated with the plurality of workstations WS1 to WSn, so that they are manipulated by the workstations to which they are allocated. The graphic data 2 is therefore manipulated in units of a segment area concurrently by the workstations.

Unlike the prior art, the present invention does not employ a complex manipulation method in which when a large amount of graphic data is concerned, the graphic data is fully split into a plurality of graphic data groups, the graphic data groups are manipulated by respective workstations, and then the resultant data provided by the workstations are merged. The present invention provides a method in which a large amount of graphic data installed in one workstation is accessed simultaneously by a plurality of workstations, and the workstations manipulate predetermined segment areas of the graphic data. The original graphic data therefore remains united, but will not be split for separate manipulation and then merged later.

According to the present invention, as mentioned above, a plurality of workstations are prepared so that the respective workstations can access areas of one graphic data and manipulate allocated areas. This environment is defined as a "distributed input environment."

A system of another embodiment of the present invention is based on the aforesaid basic system, wherein different arbitrary areas of the graphic data 2 to be manipulated may be displayed on the plurality of workstations WS1 to WSn.

According to this embodiment of the present invention, in the aforesaid basic system, different arbitrary areas of the graphic data 2 to be manipulated are displayed on the plurality of workstations WS1 to WSn. Users can proceed with work using the areas of the graphic data 2 displayed on the workstations. Similarly to the aforesaid basic system, this system enables allocation and manipulation of the one large amount of graphic data 2.

A system of the third embodiment of the present invention is based on either of the above two systems, wherein commands and events such as an event for graphic selection, which are entered at the plurality of workstations WS1 to WSn, are received to manipulate the graphic data 2 to be manipulated.

According to the third embodiment of the present invention, in either of the above two systems, commands and events such as an event for graphic selection which are entered at the plurality of workstations WS1 to WSn are received to manipulate the graphic data 2 to be manipulated. Similarly to the first and second embodiments, this embodiment enables allocation and manipulation of the large amount of graphic data 2.

A system of the fourth embodiment of the present invention is based on, for example, the system of the third embodiment, wherein when one workstation executes a time-consuming command, the fact is reported to the other workstations.

According to the fourth embodiment of the present invention, in the system of the third embodiment, when one workstation executes a time-consuming command, the fact is reported to the other workstations. The workstations therefore cooperate to proceed with the work.

A system of the fifth embodiment of the present invention is based on the system of the fourth embodiment, wherein when one workstation executes a time-consuming command, the workstation asks the other workstations for acknowledgment.

According to the fifth embodiment of the present invention, in the system of the fourth embodiment, when one workstation executes a time-consuming command, the workstation asks the other workstations for acknowledgment. Similarly to those in the fourth embodiment, the workstations cooperate to proceed with the work.

A system of the sixth embodiment is based on the system of the third, fourth, or fifth embodiment, wherein commands are divided into shared commands that can be selected simultaneously by the plurality of workstations WS1 to WSn and exclusive commands that when selected by a certain workstation, cannot be selected by the other workstations. When entered at the workstations, commands are handled depending on whether they are shared commands or exclusive commands.

According to the sixth embodiment of the present invention, in the system of the third, fourth, or fifth embodiment, commands are divided into shared commands that can be selected simultaneously by the plurality of workstations WS1 to WSn and exclusive commands that when selected by a certain workstation, cannot be selected by the other workstations. When entered at the workstations, commands are handled depending on whether they are shared commands or exclusive commands. Processing performed in the plurality of workstations is related mutually and organically, which results in improvement in processing efficiency.

A system of the seventh embodiment of the present invention is based on any of the systems of the aforesaid embodiments, wherein data manipulated by a certain workstation can be displayed on any other workstation.

According to the seventh embodiment of the present invention, in any of the systems of the aforesaid embodiments, data manipulated by a certain workstation can be displayed on any other workstation. Users can proceed with work while checking the progresses of processing under way in other workstations.

A system of the eighth embodiment of the present invention is based on any of the systems of the aforesaid embodiments, wherein all of the graphic data 2 to be manipulated can be displayed on the workstations WS1 to WSn.

According to the eighth embodiment of the present invention, in any of the systems of the aforesaid embodiments, all of the graphic data 2 to be manipulated can be displayed on the workstations WS1 to WSn. Users can proceed with work while checking the total progress of processing under way in the other workstations.

A system of the ninth embodiment of the present invention is based on any of the systems of the aforesaid embodiments, wherein a means for implementing a distributed input environment is incorporated in the window system 1. The application program 3 can therefore construct a system while being unaware of the distributed input environment.

According to the ninth embodiment of the present invention, in any of the systems of the aforesaid embodiments, a means for implementing a distributed input environment is incorporated in the window system 1. The application program 3 can therefore construct a system while being unaware of the distributed input environment. A developer of an application program can develop an application program enabling distributed input merely by proceeding with the development according to a conventional procedure. All application programs based on the window system according to the present invention can be run through the same man-machine interface and graphical user interface, which improves operability.

A system of the tenth embodiment of the present invention is based on any of the systems of the aforesaid embodiments, wherein a window copying means 1g is included to copy a window opened in a workstation into any other workstation. The window copying means 1g is used to copy an editing window so that a window is opened in any other workstation.

According to the tenth embodiment of the present invention, in any of the systems of the aforesaid embodiments, a window copying means 1g is included to copy a window opened in a workstation into any other workstation. The window copying means 1g is used to copy an editing window so that a window is opened in any other workstation. An application program developer need therefore manage only one editing window. Similarly to the ninth embodiment, the tenth embodiment allows an application program developer to develop an application program enabling distributed input merely by proceeding with the development using conventional procedures.

A system of the eleventh embodiment of the present invention is based on any of the systems of the aforesaid embodiments, wherein a window copying means 1g is included to copy a window opened in one workstation into any other workstation. The window copying means 1g is used to copy a menu window so that a window is opened in any other workstation.

According to the eleventh embodiment of the present invention, in any of the systems of the aforesaid embodiments, a window copying means 1g is included to copy a window opened in one workstation into any other workstation. The window copying means 1g is used to copy a menu window so that a window is opened in any other workstation. Similarly to the tenth embodiment, the eleventh embodiment allows an application program developer to manage a menu window alone and develop an application program enabling distributed input merely by proceeding with the development using conventional procedures.

A system of the twelfth embodiment of the present invention is based on any of the systems of the aforesaid embodiments, wherein an event managing means 1d is included to manage events, which occur sequentially in the workstations WS1 to WSn connected over the network 5, by workstations. When an event becomes significant, the event is reported to the application program 3.

According to the twelfth embodiment of the present invention, in any of the systems of the aforesaid embodiments, an event managing means 1d is included to manage events, which occur sequentially in the workstations WS1 to WSn connected over the network 5, by workstations. When an event becomes significant, the event is reported to the application program 3. The events occurring in the workstations can therefore be handled efficiently.

A system of the thirteenth embodiment of the present invention is based on any of the systems of the aforesaid embodiments, wherein a message processing means 1f is included. When the result of processing performed by the application program 3 is to be reported to the workstations, the message processing means 1f identifies a message destination and then outputs a message to the destination workstation.

According to the thirteenth embodiment of the present invention, in any of the systems of the aforesaid embodiments, a message processing means 1f is included. When the result of processing performed by the application program 3 is to be reported to the workstations, the message processing means 1f identifies a message destination and then outputs a message to the destination workstation. Messages can therefore be output to the workstations, independently of an application program.

Next, the basic configuration of an interactive graphic system according to the present invention and the operation of each of the components thereof will be described in detail.

Figure 2:
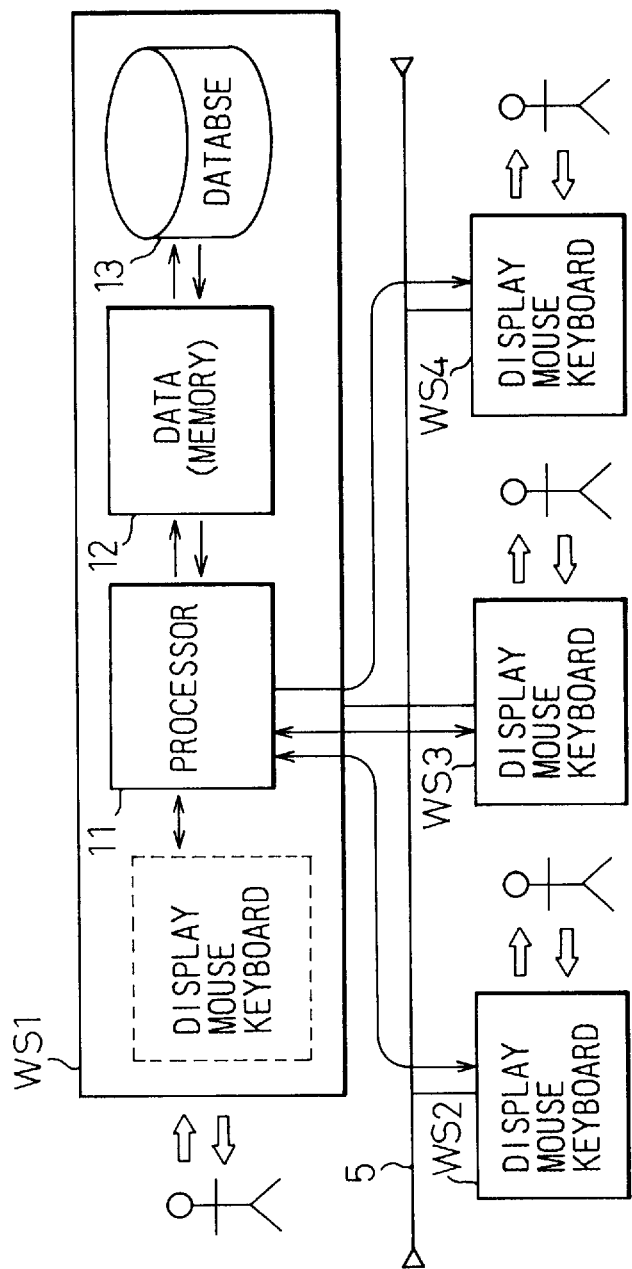
FIG. 2 shows a system configuration in an embodiment of the present invention.

FIG. 2 shows an overall configuration of a basic interactive graphic system in an embodiment of the present invention. In FIG. 2, four workstations are connected over a network.

In FIG. 2, WS1, WS2, WS3, and WS4 denote workstations connected over a network. The workstation WS1 includes a processor 11 for manipulating graphic data, a memory 12 for holding graphic data, a database 13 for storing graphic data and other data, a display, a mouse, and a keyboard. Each of the workstations WS2, WS3, and WS4 includes a display, a mouse, and a keyboard. In the figure, 5 denotes a network over which the workstations are connected. The workstations WS1, WS2, WS3, and WS4 transfer commands, messages, and data over the network 5.

Figure 3:
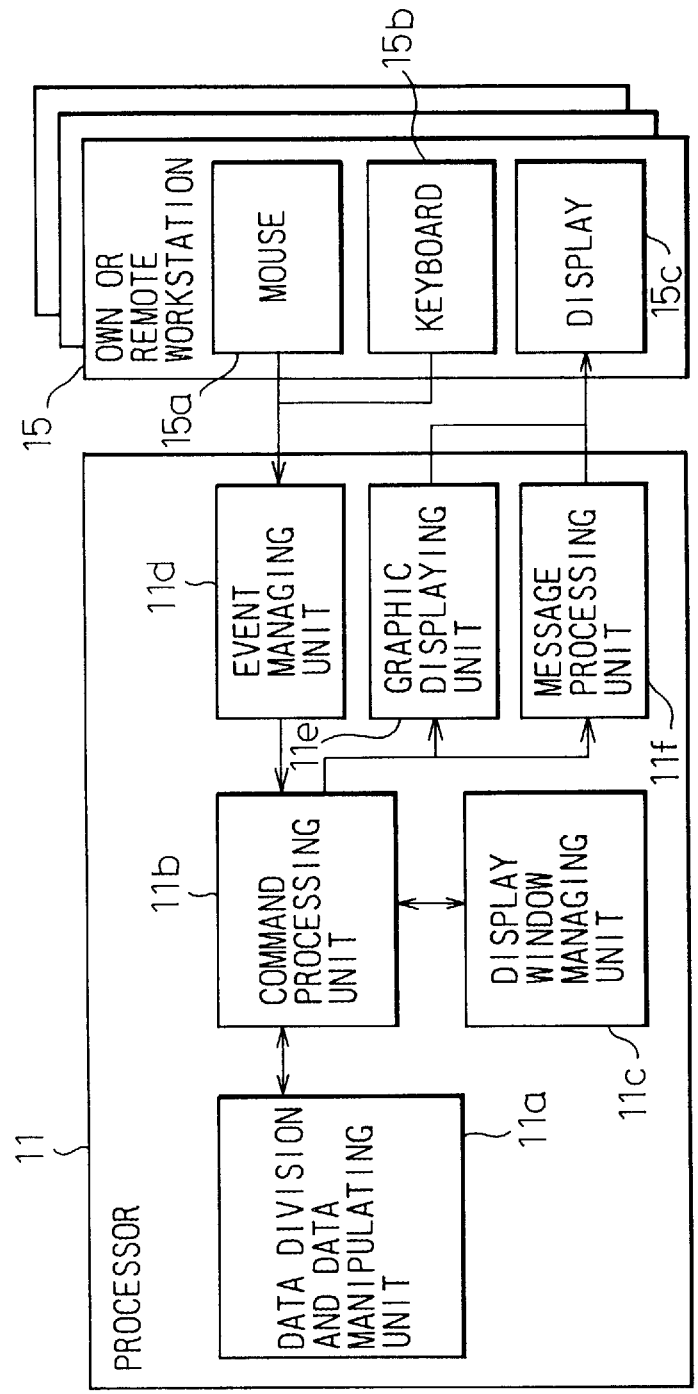
FIG. 3 shows a configuration of a processor in the first embodiment of the present invention.

FIG. 3 shows a configuration of the processor 11 shown in FIG. 2. In FIG. 3, 11a denotes a data division and data manipulating unit for holding graphic data and manipulating data; 11b denotes a command processing unit for processing commands entered at the keyboard, such as, Add, Delete, and Move commands; 11c denotes a display window managing unit for managing areas of graphic data to be manipulated by the workstations or managing window areas; 11d denotes an event managing unit for handling events entered using the mouse or keyboard; 11e denotes a graphic displaying unit for outputting graphic data to a display; and 11f denotes a message processing unit for handling messages to be output to the display.

Reference numeral 15 denotes an operation display unit in any of the workstations WS1 to WS4 shown in FIG. 2. The operation display unit 15 includes a mouse 15a, a keyboard 15b, and a display 15c. The operation display unit in the workstation WS1 is connected directly to the processor 11. The operation display units in the workstations WS2, WS3, and WS4 are connected to the processor 11 in the workstation WS1 over the network 5.

Figure 4:
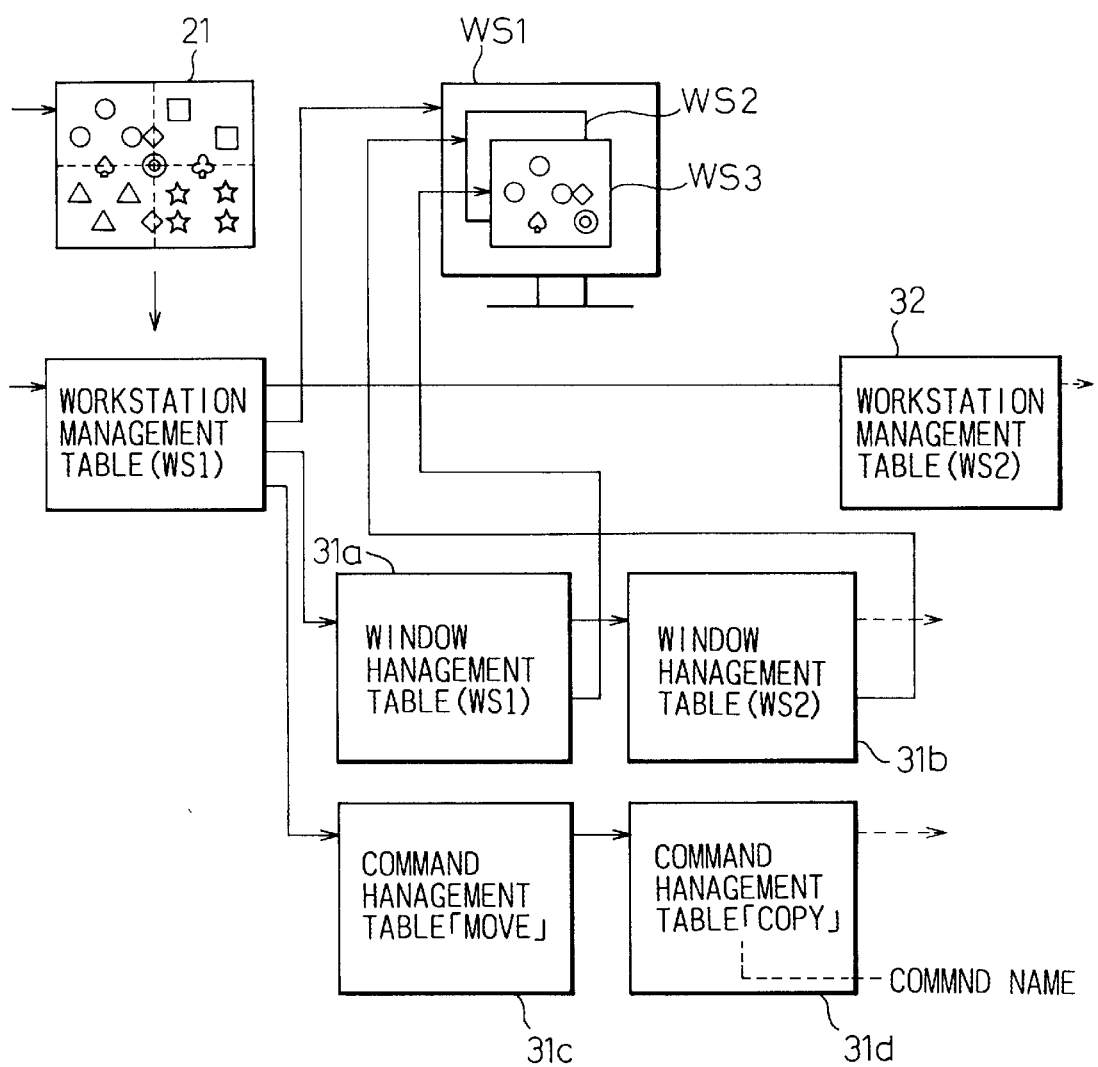
FIG. 4 shows the outline of processing tables in the first embodiment of the present invention.

FIG. 4 shows an outline configuration of processing tables such as workstation management tables or command stack tables. In FIG. 4, 21 denotes graphic data to be manipulated. The graphic data 21 is quartered along the dotted lines in FIG. 4. A portion of the quartered graphic data is appearing as a window screen on the display of the workstation WS1.

Reference numerals 31 and 32 denote workstation management tables for use in managing data areas to be manipulated by the workstations WS1 and WS2 respectively. 31a and 31b denote window management tables for use in managing window areas for data being manipulated by the workstations WS1 and WS2.

Reference numerals 31c and 31d denote command stack tables for use in holding commands entered at the workstation WS1.

FIG. 4 shows the workstation management tables 31 and 32 and the window management tables 31a and 31b alone. These tables are installed in each workstation.

Figure 5:
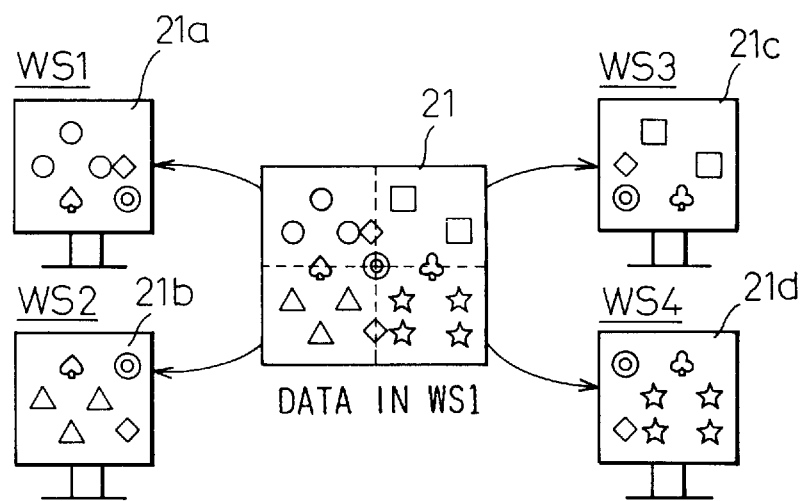
FIG. 5 shows an example of data splitting.

FIG. 5 shows an example of allocation and manipulation of graphic data in this embodiment. In FIG. 5, the graphic data is segmented into four areas, and four workstations are employed to effect allocation and design.

In FIG. 5, 21 denotes graphic data to be designed. 21a, 21b, 21c, and 21d denote data to be manipulated by the workstations WS1, WS2, WS3, and WS4.

FIGS. 6A to 6C show examples of screens appearing on the display of each workstation. A display screen 41 is, for example, as shown in FIG. 6A, composed of a title field 41a for indicating a title of data to be processed for designing graphics, a message field 41b for displaying a message sent from any other workstation, a command display field 41c for displaying an editing command, and an editing screen 41d for displaying all or part of an image to be designed.

In the system of this embodiment, when data is to be manipulated in parallel by a plurality of people, as shown in FIG. 5, the data to be processed for designing graphics is divided into the number of areas corresponding to the number of workstations, for example, four areas, and then allocated to the workstations. At this time, as shown in FIG. 5, data areas to be allocated to workstations overlap one another so that the boundaries of the data areas are interpolated by the workstations.

As mentioned above, data areas allocated to the workstations are specified in, for example, the workstation management tables 31 and 32 shown in FIG. 4.

An editing window screen and a menu window screen shown in FIGS. 6A, 6B and 6C then appear as display screens on each workstation. An operator of each of the workstations WS1, WS2, WS3, and WS4 can manipulate data allocated to the workstation interactively using the mouse or keyboard.

For example, when an operator enters a command for editing a screen at the workstation WS2 in FIG. 2, the command is input to the processor 11 in the workstation WS1 over the network 5. When the command is input from the workstation WS2 to the processor 11, the event managing unit 11d (See FIG. 3) in the processor 11 receives the command and transfers it to the command processing unit 11b. The command processing unit 11b references the workstation management table 32 in the display window managing unit 11c to retrieve the data area stored. If data manipulation is needed, the command processing unit 11b issues a data manipulation request to the data division and data processing unit 11a.

The result of manipulation performed by the data division and data processing unit 11a is output to the graphic displaying unit 11e. The graphic displaying unit 11e sends the result of manipulation to the display 15c of the workstation WS2 over the network. A manipulated image then appears. If necessary, a message is sent from the message processing unit 11f to the display 15c of the workstation WS2, and then displayed.

Data manipulated by other workstations also appear, for example, in different colors on the display of the workstation WS2. An operator of the workstation WS2 can proceed with work while checking data manipulated by the other workstations.

When an operator of a workstation enters a time-consuming command or an exclusive command that when selected by one workstation, cannot be selected by other workstations, such as, a File Store command or a Delete command, an indication to the effect that the command is to be executed may appear in the message fields of other workstations or the command may not be executed without acknowledgment from other workstations.

The foregoing exclusive commands may be handled separately from commands that can be selected simultaneously by a plurality of workstations (shared commands). Different processing modes may then be adopted for these two kinds of commands, so that processing in the plurality of workstations is organically related. This would improve processing efficiency.

In the aforesaid embodiment, data allocated to workstations appear on the displays of the workstations. In addition, all of an image to be manipulated may be displayed on each workstation or data except the data allocated to a workstation may be displayed selectively on that workstation.

Data allocation may be selected at each workstation.

For a system having the aforesaid distributed processing facility (that is, the distributed input environment defined previously), normally, the distributed processing facility must be incorporated in each application program. This would be a great burden on an application program developer.

In another embodiment to be described below, an application program developer can develop an application program having the distributed input facility merely by proceeding with the development as if the developer were creating an ordinary application program for editing using one terminal while not being aware of the distributed input facility.

FIG. 7 shows a configuration of a processor 11 having the distributed input facility in the thirteenth embodiment of the present invention.

In FIG. 7, components identical to those shown in FIG. 2 are assigned the same reference numerals. In the figure, 11a denotes a data division and data processing unit; 11b denotes a command processing unit; 11c denotes a display window managing unit; 11d denotes an event managing unit; 11e denotes a graphic displaying unit; and 11f denotes a message processing unit for processing messages.

Reference numeral 11g denotes a main management table for managing workstation management tables, window management tables, command management tables and other tables. The main management table 11g contains current values indicating a workstation, a window, a command, and other values which are currently being processed. The processor 11 effects processing according to the current values. In the figure, 11h denotes a copying unit. The copying unit 11h copies a given workstation management table for, for example, the workstation WS1 to create workstation management tables for other workstations when a window is opened in the workstation WS1.

Reference numeral 15 denotes an operation display unit of any of the workstations WS1 to WS4. The operation display unit 15 includes a mouse 15a, a keyboard 15b, and a display 15c. Similarly to the processor shown in FIG. 2, even in this processor, the operation display unit of the workstation WS1 is connected directly to the processor 11 and the operation display units of the workstations WS2, WS3, and WS4 are connected to the processor 11 in the workstation WS1 over the network 5. In FIG. 7, 16 denotes an application program.

Figure 8A:
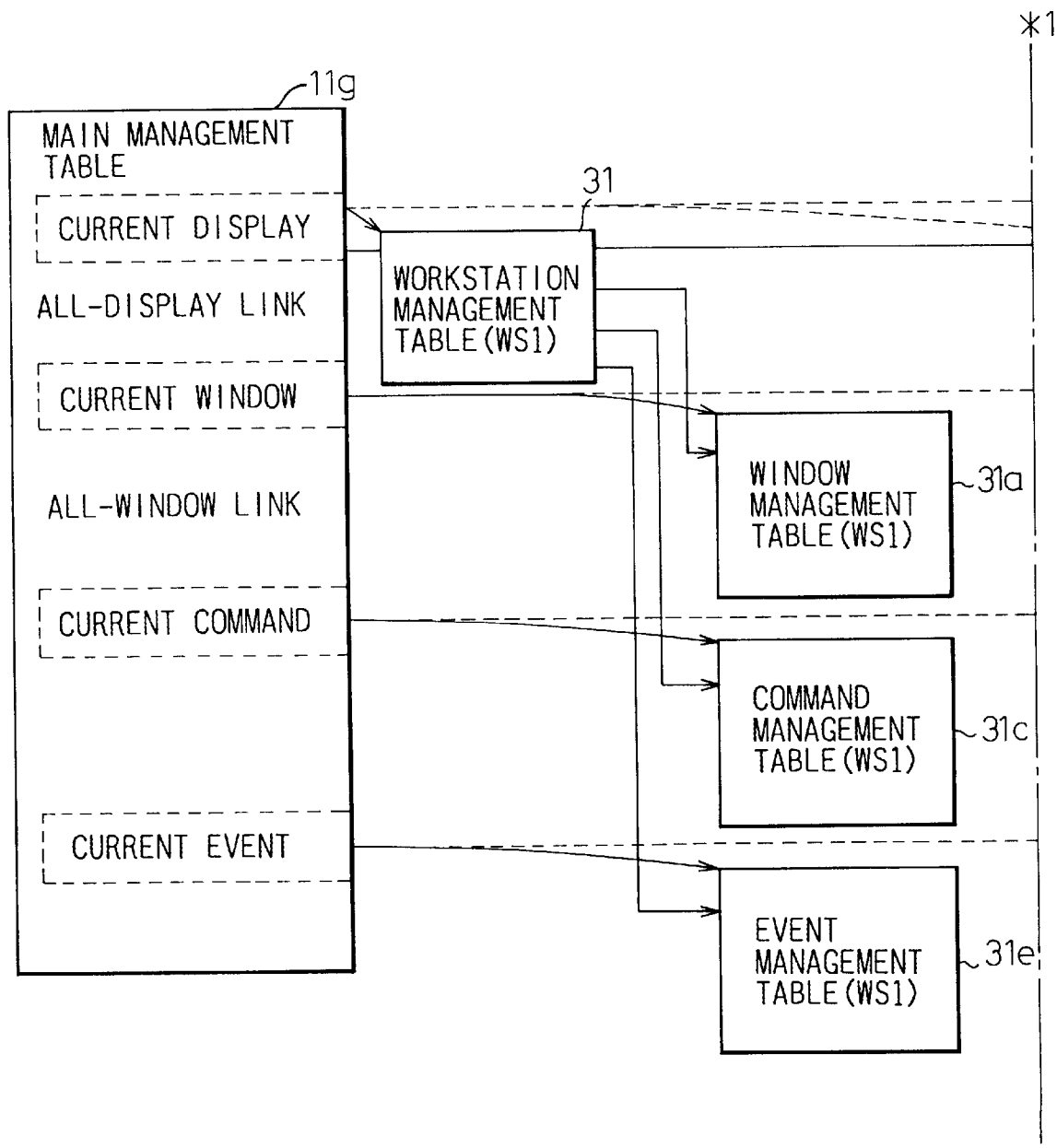
FIG. 8A and 8B show the outline of processing tables in the second embodiment of the present invention.
Figure 8B:
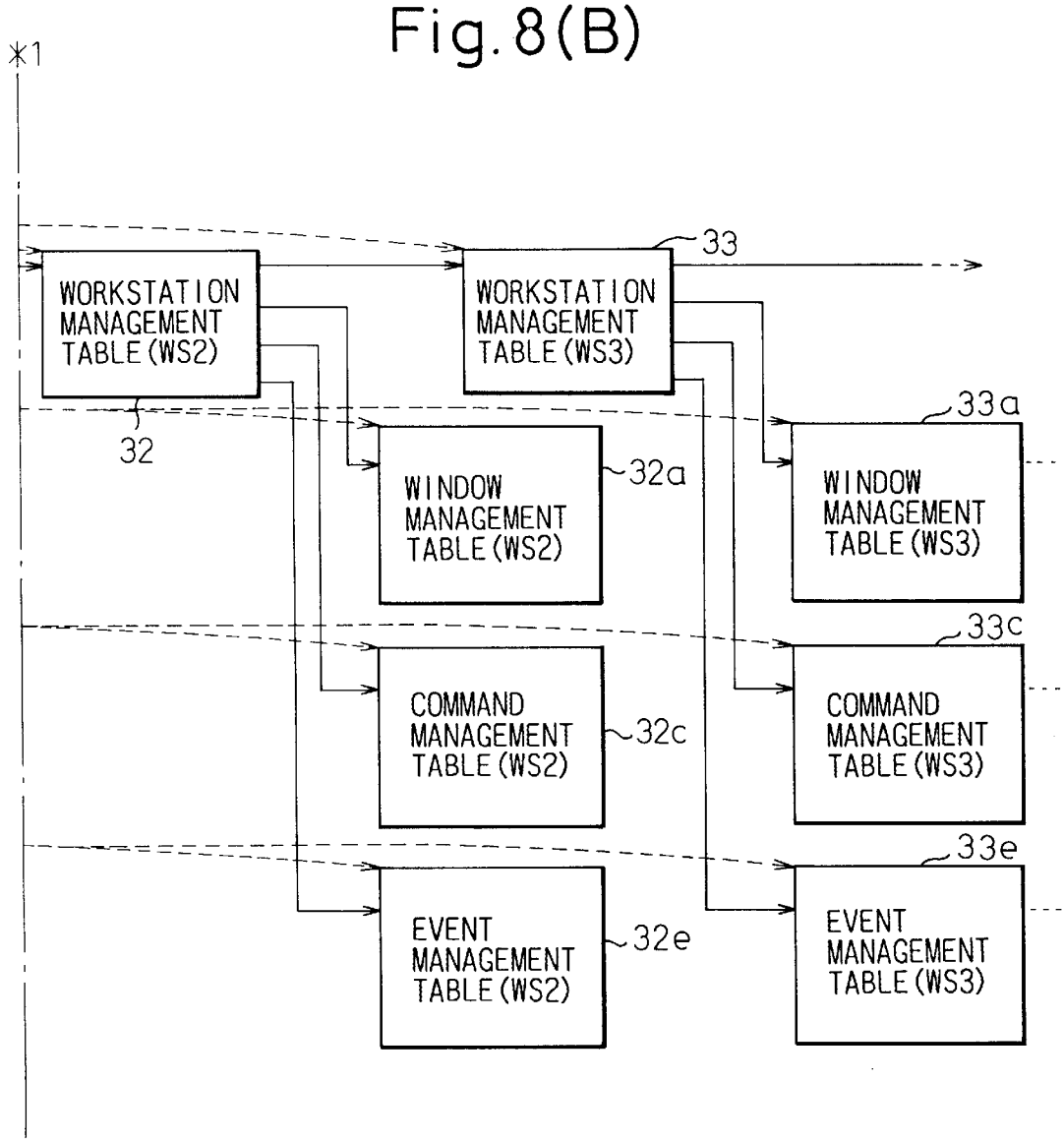

FIG. 8A and 8B show an outline configuration of the main management table 11g shown in FIG. 7, and the workstation management tables, window management tables, command management tables, and event management tables existent in the display window managing unit 11c, event managing unit 11d, and command processing unit 11e, respectively.

In FIGS. 8A and 8B, 11g denote the main management table. The main management table 11g contains current values indicating a workstation, a window, a command, and other values which are currently being processed. For example, if an event occurs in a workstation, the workstation in which the event occurs is identified and a current value of a workstation is changed to a value indicating the workstation in which the event occurs.

Reference numerals 31, 32, and 33 denote, similarly to FIG. 4, the workstation management tables for use in managing data areas to be manipulated by the workstations WS1, WS2, and WS3; 31a, 32a, and 33a denote the window management tables for use in managing the window areas in the workstations WS1, WS2, and WS3; 31c, 32c, and 33c denote the command management tables; and 31e, 32e, and 33e denote the event management tables for use in managing events occurring in the workstations WS1, WS2, and WS3.

Figure 9:
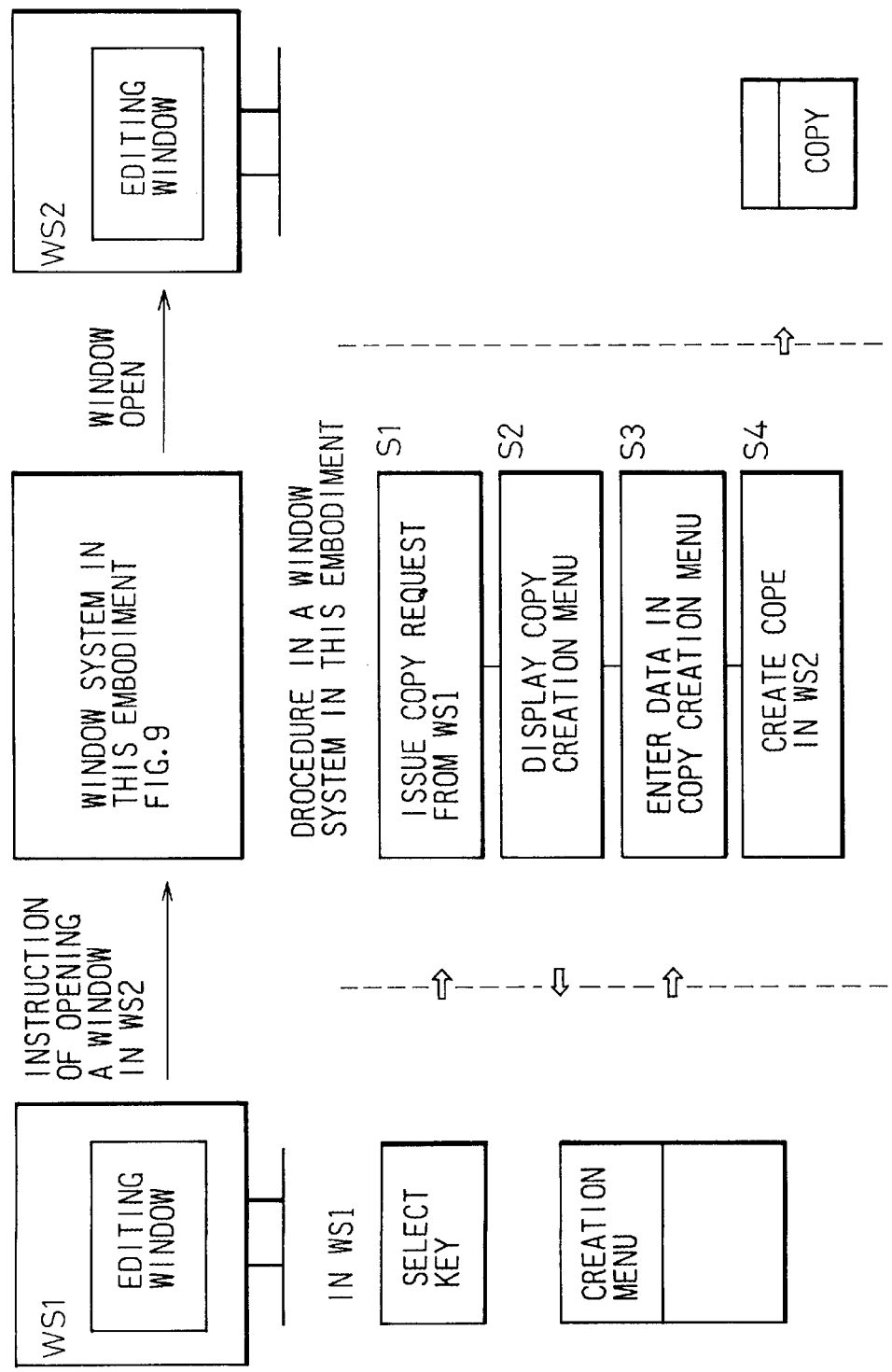
FIG. 9 is an explanatory diagram concerning processing to be performed when a window is opened.

FIGS. 9 to 11 are explanatory diagrams concerning processing to be performed when a window is opened in this embodiment. Referring to FIGS. 9 to 10, window open in this embodiment will be described.

In FIG. 9, when the workstation WS1 in which a program is running is used to open a window in any other workstation (workstation WS2 in FIG. 9), a key in the workstation WS1 is pressed to enter a Window Open command. This causes the workstation WS1 to issue a Copy request to the window system in this embodiment (step S1). A creation menu then appears in a screen of the workstation WS1 (step S2).

A user enters a workstation name (for example, WS2), in which a window is opened, in the creation menu (Step S3). The copying unit 11h in the processor 11 then creates a copy as a management table for managing the workstation WS2 (step S4). This allows an editing window and others to appear on the workstation WS2. The user then operates the workstation WS2 to manipulate data.

Figure 11A:
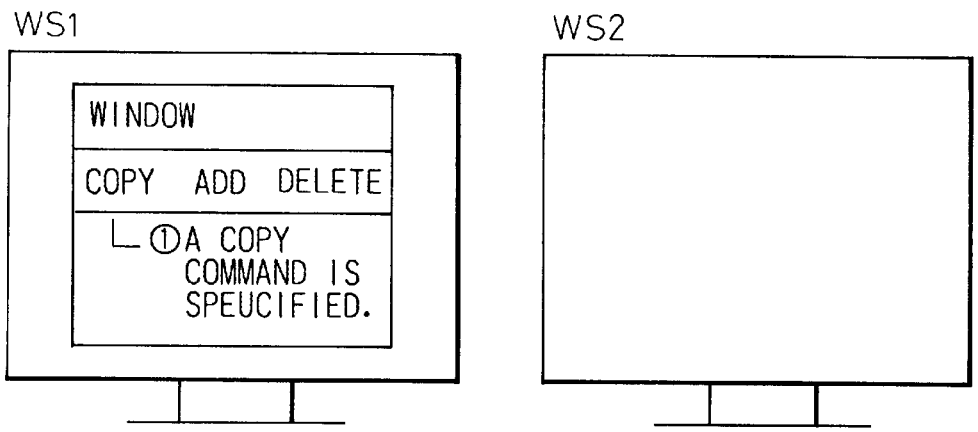
FIGS. 11A, 11B, 11C, and 11D show examples of operation for an editing window copy to be performed when a window is opened.
Figure 11B:
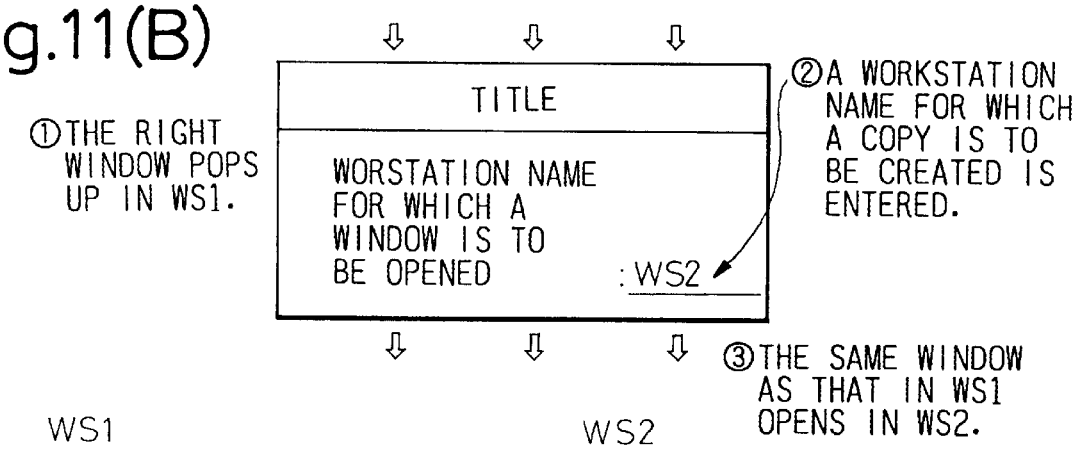

FIGS. 11A to 11D show an example of operation for effecting an editing window copy when a window is opened. As shown in FIG. 11A, when a Copy command is specified in the editing window of the workstation WS1, a window shown in FIG. 11B pops up in the editing window of the workstation WS1.

Figures 11C, 11D:
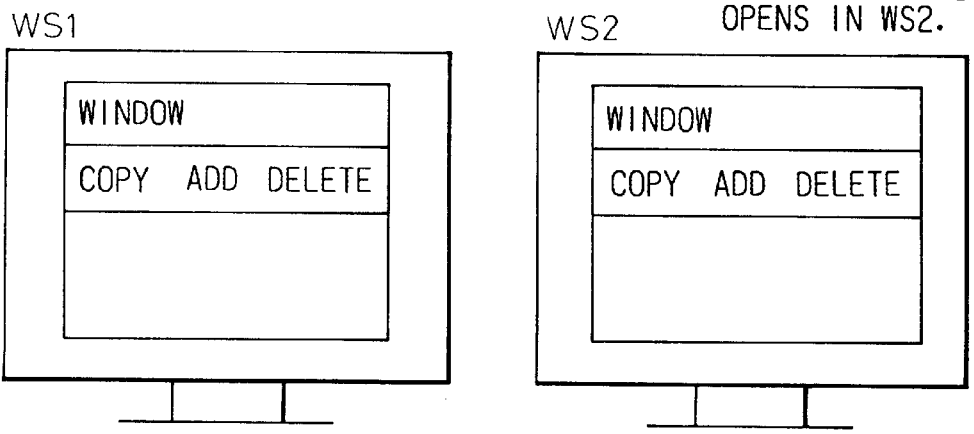

A user then enters a workstation name for which a copy is to be created. As shown in Figs. 11C and 11D, the same editing window then opens in the workstation WS2.

Figure 12:
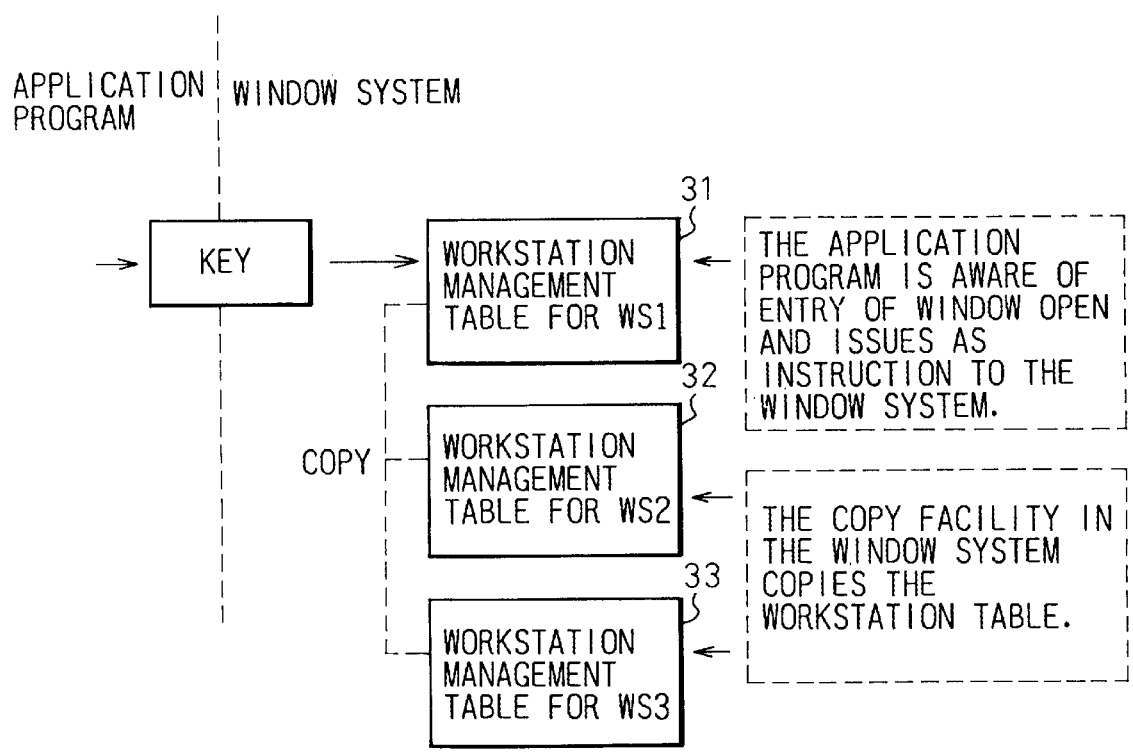
FIG. 12 is an explanatory diagram concerning a mechanism for leaving an application program unaware of a distributed input facility.

FIG. 12 is an explanatory diagram concerning a mechanism for leaving an application program unaware of the distributed input facility in this embodiment. As shown in FIG. 12, an application program is interfaced with the window system via a key. When the key is pressed to send a window open instruction from the application program to the window system, a copy facility residing in the window system copies the management table for a specified workstation.

As mentioned above, windows are opened in a plurality of workstations. If events originate from the operation display units 15 (FIG. 7) in the workstations, the event managing unit 11d in this embodiment manages the events all together and sends an application program a report to the effect that the events originate from one operation display unit 15.

Figure 13:
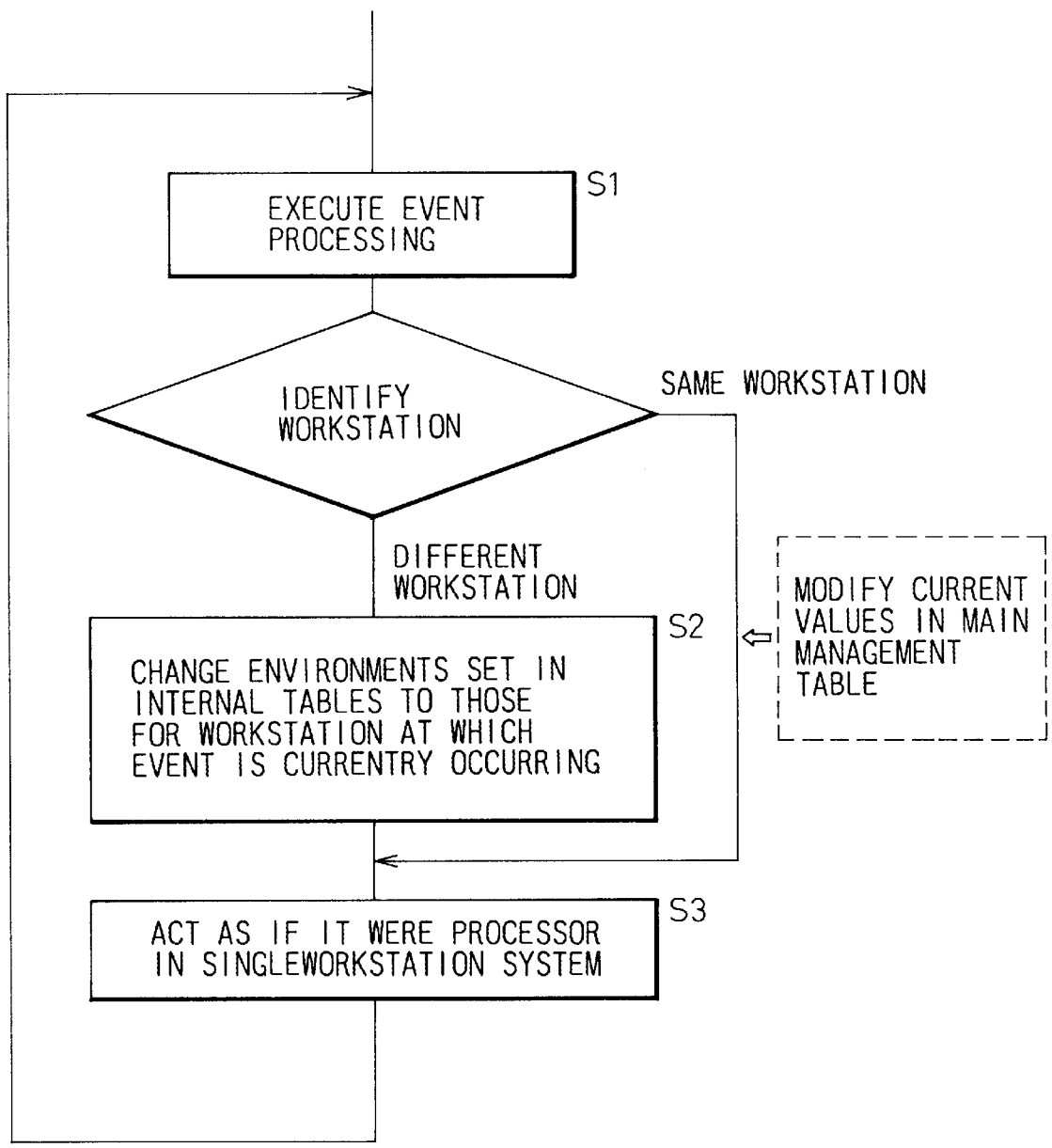
FIG. 13 is an explanatory diagram concerning a mechanism for effecting event processing.

As shown in FIG. 13, if event processing is activated (step S1), a workstation in which an event occurs is identified. If the event occurs in the same workstation as the one that has been considered so far, control is passed to step S3. The system acts as if it were a single-workstation system. If the event occurs in a workstation different from the one that has been considered so far, the environments specified in the internal tables are modified to be consistent with the workstation at which the event is currently entered. In other words, as shown in FIG. 7, the current values specified in the main management table 11g are rewritten according to an occurring event. Control is then passed to step S3. The system then acts as if it were a single-workstation system.

The event managing unit 11d manages events occurring in a plurality of workstations by workstations. When an event occurring in a workstation becomes significant, the event managing unit 11d posts the event to the application program.

Assuming that events for specifying four points of a rectangle occur in the workstation WS1 and events for specifying a center of a circle and a point on the circumference occur in the workstation WS2, the event managing unit 11d posts the events for specifying four points of a rectangle occurring in the workstation WS1 to the application program, and posts the events for specifying the center of a circle and the point on the circumference occurring in the workstation WS2 to the application program.

It is the window system in this embodiment that outputs the contents of processing, which are derived from the events and applied to the associated operation display units 15, to the operation display units 15.

For outputting a message reporting the result of processing performed by the application program to the user, for example, the message processing unit 11f (FIG. 7) references the main management table 11g to retrieve current values, and then outputs the message to the associated workstation.

In this embodiment, as described above, the window system implements the facilities for making a copy when a window is opened and for providing a distributed input environment for managing input and output events. The window system is interfaced with an application program via a key. An application program developer therefore can develop an application program while not being aware of the facility for providing the distributed input environment. In other words, an application program developer need manage only one set of an editing window and a menu window. When an application program developer creates an application program as if the developer were creating an ordinary application program using a sole display, the developer can develop an application program having a distributed input facility.

As apparent from the previous description, according to the present invention, one block of graphic data can be manipulated concurrently by a plurality of workstations. The present invention therefore realizes the advantages (1) to (3) described below, thus greatly improving design efficiency. When the window system is provided with a means for implementing a distributed input environment, the interactive graphic system can be constructed without necessity of the application side (3) being aware of the distributed input environment. This provides the advantages (4) to (6) below.

(1) Consistent data can be manipulated concurrently by a plurality of people, which contributes to minimization of design time.

(2) A large amount of data can be managed as one consistent block of data. This maintains consistency in data and improvement of data reliability.

(3) The progress of processes performed by other people can be grasped in real time. This permits understanding of the overall progress in processing and eventually simplifies process control.

(4) An application program developer can develop an application program enabling distributed input merely by proceeding with the development in a conventional manner.

(5) A user can use the distributed input facility with ease, which contributes to minimization of design time.

(6) All application programs based on the window system of the present invention can be run through the same man-machine interface or graphic user interface, which improves operability.

I claim:

1. An interactive graphic processing method in which a plurality of terminal equipment connected over a network are used to process data interactively, graphic data to be manipulated being installed in a respective terminal equipment of the plurality of terminal equipment, the method comprising:

segmenting the graphic data installed in the respective terminal equipment into a plurality of areas;

associating the plurality of areas with the plurality of terminal equipment so that the plurality of areas respectively correspond to the plurality of terminal equipment;

allocating the plurality of areas so that each area of the plurality of areas is allocated to the corresponding terminal equipment of the plurality of terminal equipment;

producing manipulation data for each area of the graphic data installed in the respective terminal equipment by the corresponding terminal equipment, the manipulation data indicating manipulations to be made to the respective area;

sending the manipulation data produced by the plurality of terminal equipment to the respective terminal equipment having the graphic data installed therein; and manipulating the graphic data by the respective terminal equipment having the graphic data stored therein, in accordance with the manipulation data produced by the plurality of terminal equipment.

2. An interactive graphic processing method according to claim 1, further comprising the step of:

selectively displaying different arbitrary areas of the plurality of areas on the plurality of terminal equipment.

3. An interactive graphic processing method according to claim 1, wherein the manipulation data includes commands and events.

4. An interactive graphic processing method according to claim 1, further comprising the step of, when a time-consuming command to be executed is issued by the respective terminal equipment of the plurality of terminal equipment:

reporting the issuance of the time-consuming command to the other terminal equipment of the plurality of terminal equipment.

5. An interactive graphic processing method according to claim 4, further comprising the step of, when a time-consuming command is to be executed by the respective terminal equipment:

receiving acknowledgments from the other terminal equipment of the plurality of terminal equipment.

6. An interactive graphic processing method according to claim 1, wherein commands are divided into shared commands that can be selected simultaneously by the plurality of terminal equipment and exclusive commands that, when selected by the respective terminal equipment of the plurality of terminal equipment, cannot be selected by any other terminal equipment of the plurality of terminal equipment, the method further comprising the step of, when a command is received from a respective terminal equipment of the plurality of terminal equipment:

processing the command in accordance with whether the command is a shared command or an exclusive command.

7. An interactive graphic processing method according to claim 1, further comprising the step of:

sequentially displaying graphic data manipulated in accordance with manipulation data produced by the respective terminal equipment of the plurality of terminal equipment in the other terminal equipment of the plurality of terminal equipment.

8. An interactive graphic processing method according to claim 1, further comprising the step of:

displaying all of the graphic data to be manipulated on each terminal equipment of the plurality of terminal equipment.

9. An interactive graphic processing method according to claim 1, wherein each terminal equipment of the plurality of terminal equipment includes a window system.

10. An interactive graphic processing method according to claim 9, wherein the window system of each terminal equipment implements a distributed input environment so that an application program running on the terminal equipment does not need to be aware of the distributed input environment.

11. An interactive graphic processing method according to claim 10, further comprising the step of:

copying an editing window opened in one terminal equipment of the plurality of terminal equipment into an open window of a different terminal equipment of the plurality of terminal equipment.

12. An interactive graphic processing method according to claim 11, further comprising the step of:

copying a menu window of one terminal equipment of the plurality of terminal equipment to open windows in the other terminal equipment of the plurality of terminal equipment.

13. An interactive graphic processing method according to claim 1, further comprising the steps of:

managing events which occur in the plurality of terminal equipment, and when an event becomes significant, posting the event to an application program.

14. An interactive graphic processing method according to claim 1, further comprising the step of, when the result of processing performed by an application program is to be reported to a respective terminal equipment of the plurality of terminal equipment:

identifying the respective terminal equipment to which the result is to be reported, and reporting the result to the identified terminal equipment.

15. An interactive graphic processing method according to claim 1, wherein a portion of the graphic data are allocated to a plurality of terminal equipment in an overlapping manner.

16. An interactive graphic processing apparatus in which a plurality of terminal equipment connected over a network are used to process data interactively, graphic data to be manipulated being installed in a respective terminal equipment of the plurality of terminal equipment, the apparatus comprising:

means for segmenting the graphic data installed in the respective terminal equipment into a plurality of areas;

means for associating the plurality of areas with the plurality of terminal equipment so that the plurality of areas respectively correspond to the plurality of terminal equipment;

means for allocating each area of the plurality of areas to the corresponding terminal equipment of the plurality of terminal equipment;

means for producing manipulation data for each area of the graphic data installed in the respective terminal equipment by the corresponding terminal equipment, the manipulation data indicating manipulations to be made to the respective area;

means for sending the manipulation data produced by the plurality of terminal equipment to the respective terminal equipment having the graphic data installed therein; and means for manipulating the graphic data in accordance with the manipulation data produced by the terminal equipment, by the respective terminal equipment having the graphic data stored therein.

17. An interactive graphic processing apparatus according to claim 16, further comprising:

means for selectively displaying different arbitrary areas of the plurality of areas on the plurality of terminal equipment.

18. An interactive graphic processing apparatus according to claim 16, wherein the manipulation data includes commands and events.

19. An interactive graphic processing apparatus according to claim 16, further comprising:

means for, when a time-consuming command to be executed is issued by a respective terminal equipment of the plurality of terminal equipment, reporting the issuance of the time-consuming command to the other terminal equipment of the plurality of terminal equipment.

20. An interactive graphic processing apparatus according to claim 19, further comprising:

means for, when a time-consuming command is to be executed by a respective terminal equipment, receiving acknowledgments from the other terminal equipment of the plurality of terminal equipment.

21. An interactive graphic processing apparatus according to claim 16, wherein commands are divided into shared commands that can be selected simultaneously by the plurality of terminal equipment and exclusive commands that, when selected by a respective terminal equipment of the plurality of terminal equipment, cannot be selected by any other terminal equipment of the plurality of terminal equipment, the apparatus further comprising:

means for, when a command is received from a respective terminal equipment of the plurality of terminal equipment, processing the command in accordance with whether the command is a shared command or an exclusive command.

22. An interactive graphic processing apparatus according to claim 16, further comprising:

means for sequentially displaying graphic data manipulated in accordance with manipulation data produced by a respective terminal equipment of the plurality of terminal equipment in the other terminal equipment of the plurality of terminal equipment.

23. An interactive graphic processing apparatus according to claim 16, further comprising:

means for displaying all of the graphic data to be manipulated on each terminal equipment of the plurality of terminal equipment.

24. An interactive graphic processing apparatus according to claim 16, wherein each terminal equipment of the plurality of terminal equipment includes a window system.

25. An interactive graphic processing apparatus according to claim 24, wherein the window system of each terminal equipment implements a distributed input environment so that an application program running on the terminal equipment does not need to be aware of the distributed input environment.

26. An interactive graphic processing apparatus according to claim 25, further comprising:

means for copying an editing window opened in one terminal equipment of the plurality of terminal equipment into an open window of a different terminal equipment of the plurality of terminal equipment.

27. An interactive graphic processing apparatus according to claim 26, further comprising:

means for copying a menu window of one terminal equipment of the plurality of terminal equipment to open windows in the other terminal equipment of the plurality of terminal equipment.

28. An interactive graphic processing apparatus according to claim 16, further comprising:

means for managing events which occur in the plurality of terminal equipment, and means for, when an event becomes significant, posting the event to an application program.

29. An interactive graphic processing apparatus according to claim 16, further comprising:

means, when the result of processing performed by an application program is to be reported to a respective terminal equipment of the plurality of terminal equipment, for identifying the respective terminal equipment to which the result is to be reported, and for reporting the result to the identified terminal equipment.

30. An interactive graphic processing apparatus according to claim 16, wherein the allocation means allocates a portion of the graphic data to a plurality of terminal equipment in an overlapping manner.

* * * * *

UNITED STATES PATENT AND TRADEMARK OFFICE
CERTIFICATE OF CORRECTION

PATENT NO.:    5,809,240
DATED     :    September 15, 1998
INVENTOR(S):   Yoshitomo KUMAGAI It is certified that error appears in the above-identified patent and that said Letters Patent is hereby corrected as shown below:

Title Page, under [73] Assignee, change "Kanagawa" to --Kawasaki--.

In Fig. 9, change "DROCEDURE" to --PROCEDURE--.

Col. 2,     line 26, change "he" to --the--;
            line 39, change "FIG." to --FIGS.--.

Signed and Sealed this

Twenty-seventh Day of July, 1999

Attest:

Q. TODD DICKINSON

Attesting Officer                Acting Commissioner of Patents and Trademarks